UNITED STATES PATENT OFFICE.

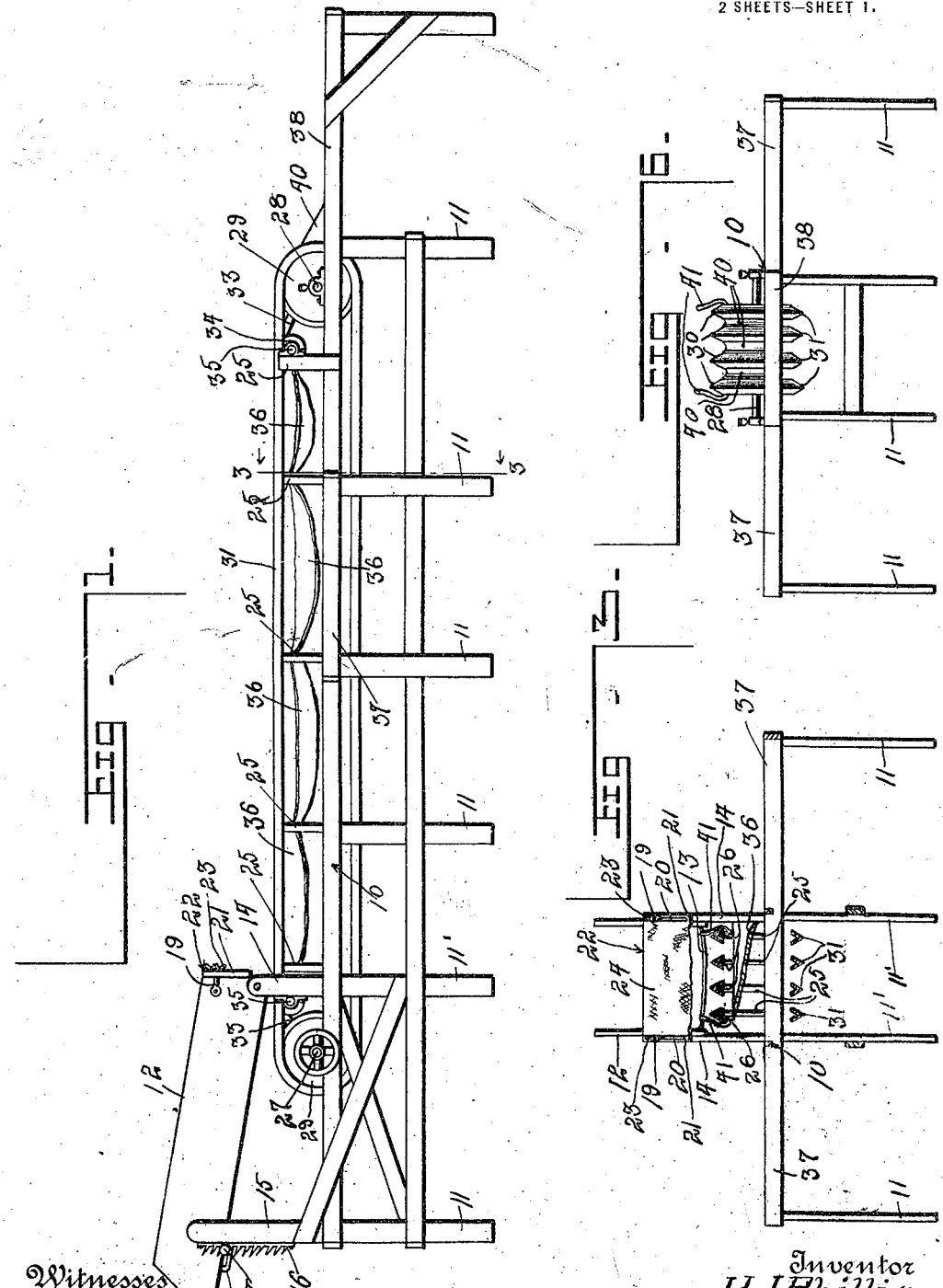

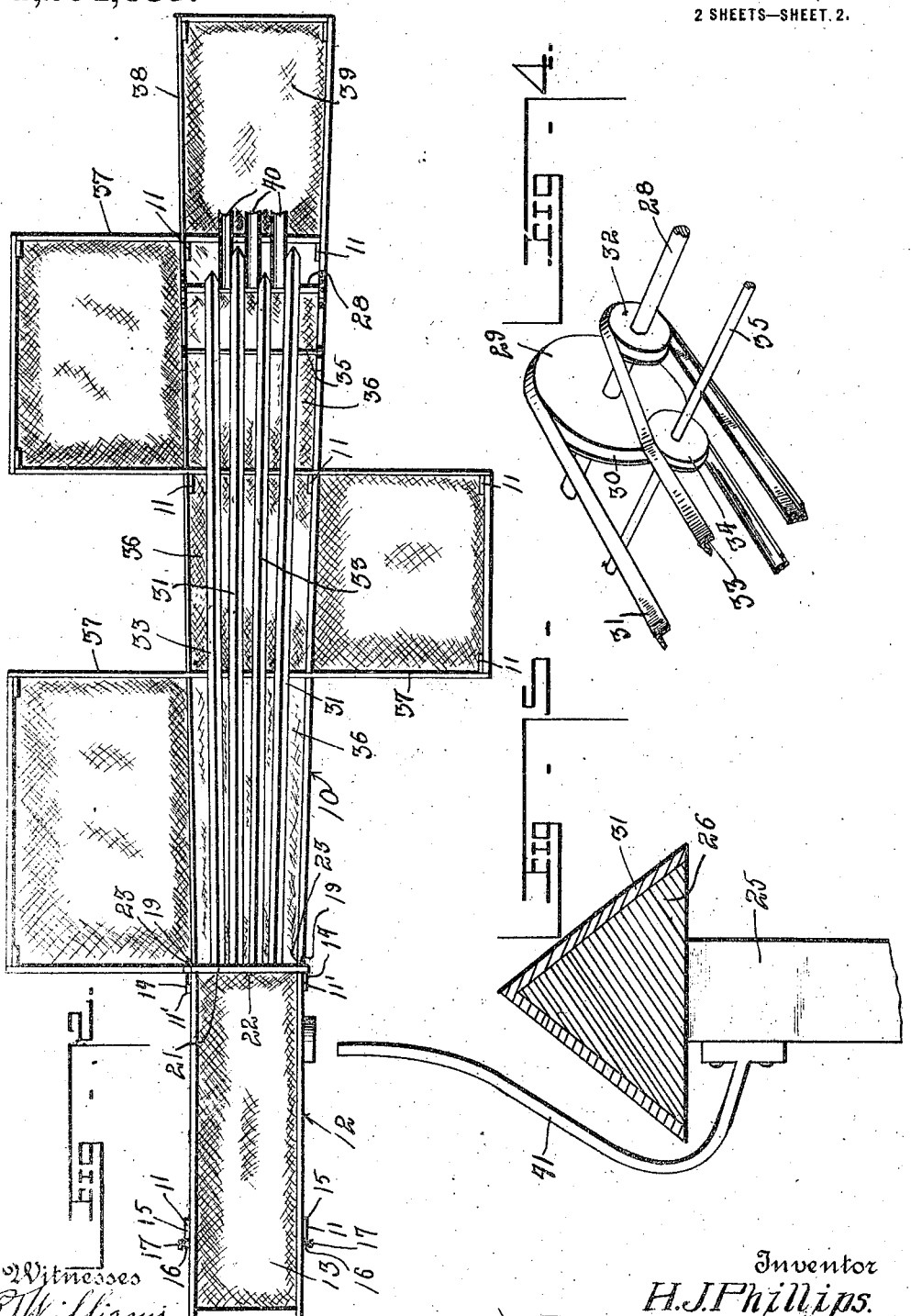

HARRY J. PHILLIPS, OF GRAND JUNCTION, COLORADO.

FRUIT GRADER AND PACKING BENCH.

1,204,685.  Specification of Letters Patent.  Patented Nov. 14, 1916.

Application filed June 30, 1913. Serial No. 776,664.

*To all whom it may concern:*

Be it known that I, HARRY J. PHILLIPS, a citizen of the United States, residing at Grand Junction, in the county of Mesa, State of Colorado, have invented certain new and useful Improvements in Fruit Grader and Packing Benches; and I do hereby declare the following to be a full, clear, and exact description of the invention, such as will enable others skilled in the art to which it appertains to make and use the same.

This invention relates to improvements in fruit grading and sorting machines.

One object of the invention is to provide a novel structure of hopper and means for feeding the fruit to the grader.

Another object is to provide an improved grader which is so constructed and arranged as to insure the proper grading or sorting of the fruit as it passes thereover.

Another object resides in the arrangement of the receptacles for receiving different grades or sizes from which the same may be conveniently removed to be packed.

Other objects and advantages will be apparent from the following description when taken in connection with the accompanying drawings.

In the drawings: Figure 1 is a side elevation of my machine. Fig. 2 is a top plan view thereof. Fig. 3 is a vertical transverse sectional view on the line 3—3 of Fig. 1, looking in the direction of the arrows. Fig. 4 is a perspective view of two of the belts of the grading device. Fig. 5 is an enlarged sectional view of one of the guides for the belt showing the side guard. Fig. 6 is an end elevation taken from the end opposite to the hopper.

Referring particularly to the accompanying drawings, 10 represents an elongated frame-work suitably supported by the legs 11. At one end of the frame-work, and suitably elevated thereabove is a hopper or feed box 12, this feed box having a bottom 13 of canvas to protect the fruit from bruising. The forward end of the hopper is pivotally mounted on the upper ends of the legs 11', these legs extending above the frame-work as indicated at 14. Carried by the upper extension 15 of the rearmost leg 11 is a rack plate 16 which is adapted to receive the end of a bar 17 arranged transversely under the rear end of the hopper and carried slidably in a slotted bracket 18 on the hopper. By means of this bar 17 and rack 16 the hopper can be swung on its forward pivot so as to increase or retard the flow of fruit therefrom. Carried on the sides at the lower ends of the hopper are the bolts 19, these bolts being received through the slots 20 of the frame 21 of the vertically adjustable door 22. Suitable nuts 23 are carried by the bolts to clamp the door in its different vertical adjustments. This door comprises the vertical side members and a transverse upper member, the same having secured thereto the canvas 24, the lower edge of the canvas being free so that the fruit will not be bruised as it passes from the lower end of the hopper.

Arranged at spaced intervals along the frame 10 are vertically disposed parallel series of posts 25, these posts carrying on their upper ends the longitudinally extending triangular guide strips 26. Extending transversely of the frame, and suitably journaled thereon at opposite ends are the shafts 27 and 28, each of these shafts carrying a plurality of pulleys 29, said pulleys being oppositely beveled on their peripheries as indicated at 30. Trained around the pulleys 29 and properly guided on the strips 26 are the V-shaped belts 31. Also mounted on the shafts 27 and 28 are smaller similarly shaped pulleys 32, these pulleys also having trained around them V-shaped belts 33. To bring the belts 33 up to the level of the belts 31 and dispose them on the guide strips 26, I arrange the pulleys 34 similar to the pulleys 32, but on a shaft 35 disposed in advance of the shafts 27 and 28. The upper portions of the belts 33 are trained over the pulleys 34, as clearly shown in Figs. 1 and 4. These shafts 35 are journaled, respectively, on the extensions 14 of the rear legs 11', and the posts 25 near the opposite end of the machine.

Secured to the posts 25 and arranged between the upper and lower portions of the belts are the canvas bottoms 36. These canvas bottoms being arranged in sections and extending alternately from opposite sides of the frame, where they are suitably connected to frames 37, which I term benches, and from which the graded fruit is removed for packing. At the delivery end of the machine there is also a bench 38 having the canvas bottom 39, this bench being arranged slightly beyond the rear of the pulleys on the shaft 28. Arranged between the belts at the last mentioned end of the frame are downwardly inclined troughs or gutters 40, which discharge the fruit which reaches the end of the machine onto the bench 39.

Secured to the outermost series of the posts 25 are the rails 41 which prevent the fruit jumping from the side belts as it is carried along.

In the operation of the device, a suitable quantity of fruit is placed in the hopper 12 and the door 22 adjusted to the proper height to permit the fruit to flow therefrom between the lower edge of the door and the lower forward edge of the bottom of the hopper. The fruit is discharged onto the belts and rests between the adjacent portions of the V-shaped belts. These belts are arranged close together where they receive the fruit from the hopper and gradually diverge toward the opposite end, so that the spaces between the belts are gradually enlarged in a direction away from the hopper. The belts all travel in the same direction, and carry the fruit along with them, and as the fruit comes over a portion of the space between the belts which will permit it to pass through, the fruit will drop onto one or another of the canvas bottoms and roll out onto one of the benches 37.

The belts 33 being trained around smaller pulleys than the belts 31 will naturally travel at greater speeds than the belts 31. Thus the fruit is carried along from one end to the other by the belts, and at the same time a rotary movement is imparted to the fruit as it passes along. This completely turns the fruit over and over, and insures that the fruit will drop through the proper sized spaces. Some fruit is inclined to be flat, and should such a piece of fruit be disposed across the space between the belts and the belts run at the same speed, the chances for this piece of fruit to drop through the proper sized space would be reduced to a minimum, but by arranging the belts to travel at different speeds, each piece of fruit is completely turned over and over a number of times during its travel from one end of the machine to the other, and at one time or other, this piece of fruit will of necessity be presented in such position that it will quickly slip through onto one of the benches.

While I have shown and described the V-shaped belts as traveling at different speeds, I wish it understood that I may use belts of equal sizes to travel at equal speeds, without departing from the claims to the construction of the pulleys, belts and guides therefor.

What is claimed is:

1. In a fruit grader, a frame, shaft each journaled at a respective end of said frame, a series of spaced wheels provided with peripheries V-shaped in cross section with the apices of the V's outward, a second series of similarly shaped wheels mounted on the other shaft, said second set of wheels being alternately of relatively large and small diameters and being spaced farther apart than the wheels of the first set, V-shaped belts running over said wheels and means to rotate one of said wheels and thereby actuate the belts.

2. In a fruit grader, a frame, shafts each journaled at a respective end of said frame, a series of spaced wheels provided with peripheries V-shaped in cross section with the apices of the V's outward, a second series of similarly shaped wheels mounted on the other shaft, said second set of wheels being alternately of relatively large and small diameters and being spaced farther apart than the wheels of the first set, V-shaped belts running over said wheels, means to rotate one of said wheels and thereby actuate the belts, and inverted V-shaped supports between said wheels for the upper flights of said belts.

In testimony whereof, I affix my signature, in the presence of two witnesses.

HARRY J. PHILLIPS.

Witnesses:
FANNIE F. ANDERSON,
H. L. SHELLENBERGER.